United States Patent [19]

Titus, IV et al.

[11] 4,398,279
[45] Aug. 9, 1983

[54] DIGITAL DISPLAY FOR DICTATION TRANSCRIBER FOR INDICATING REMAINING TAPE WITHIN DISCRETE SEGMENTS OF DICTATION

[75] Inventors: Theodore Titus, IV, Tucker; Julius B. Bagley, Marietta, both of Ga.

[73] Assignee: Lanier Business Products, Inc., Atlanta, Ga.

[21] Appl. No.: 260,257

[22] Filed: May 4, 1981

[51] Int. Cl.³ .......................... G11B 3/82; G11B 27/34
[52] U.S. Cl. ........................................ 369/58; 369/27; 360/137
[58] Field of Search .................... 360/72.1, 72.2, 74.4; 369/27, 28, 58

[56] References Cited

U.S. PATENT DOCUMENTS

| | | | |
|---|---|---|---|
| 3,714,382 | 1/1973 | Sykes | 360/72.2 |
| 3,869,720 | 3/1975 | Ohira et al. | 369/27 X |
| 4,092,680 | 5/1978 | Sander | 369/28 X |
| 4,200,893 | 4/1980 | Matison | 369/58 X |
| 4,210,785 | 7/1980 | Huber et al. | 360/72.2 X |
| 4,224,644 | 9/1980 | Lewis et al. | 360/72.2 |
| 4,237,497 | 12/1980 | Trevithick | 360/72.1 |
| 4,241,364 | 12/1980 | Shiga | 360/137 X |
| 4,315,286 | 2/1982 | Copeland | 360/72.2 |
| 4,352,173 | 9/1982 | Titus et al. | |

FOREIGN PATENT DOCUMENTS

| | | |
|---|---|---|
| 17698 | 10/1980 | European Pat. Off. |
| 2838078 | 4/1979 | Fed. Rep. of Germany |
| 2021840 | 12/1979 | United Kingdom |

Primary Examiner—Aristotelis M. Psitos
Attorney, Agent, or Firm—Jones & Askew

[57] ABSTRACT

A display for a record playback apparatus where the record medium includes end and instruction indicia signals recorded thereon, of which the end signals delimit segments of dictation on the medium, including displays for the time remaining in the present segment (15), the number of segments yet to be reached going in the forward direction (11), the number of instruction indicia signals within the present segment (12) and the playback time remaining until the next instruction signal is reached (16). A counter (31) counts the end signals and also provides an address to an addressable memory (30) in which the number of instruction signals counted by a second counter (29) is stored. During movement of the record medium in a forward direction, the number stored in the addressable memory (30) are loaded back into the counter (29). The time remaining until next indicia signal segments are controlled by up/down counters (66, 67) which count pulses (60) corresponding to movement of increments of the record medium past a transducer. The contents of the counters (66, 67) are written into and read out of addressable memories (68, 69) during movement of the record medium. Also shown is apparatus which latches (166) an advance signal (170) which will fast wind the record medium in a particular direction until it is within a predetermined distance of the next indicia signal as detected by a comparator (160). Also shown is a counter (172) which may be preset (23) to skip a particular number of the indicia signals until the advance signal (170) is removed.

10 Claims, 14 Drawing Figures

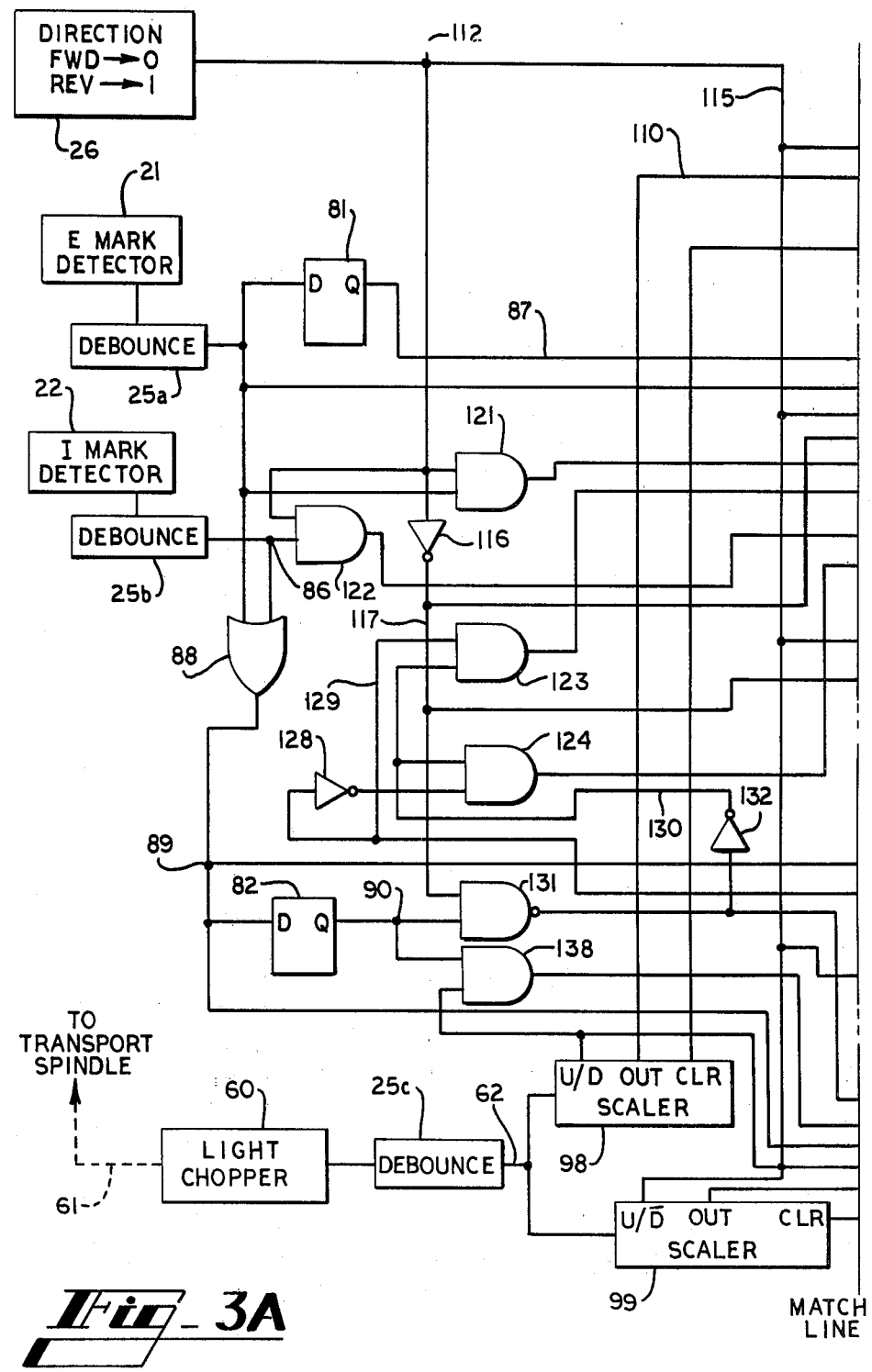
Fig_3A

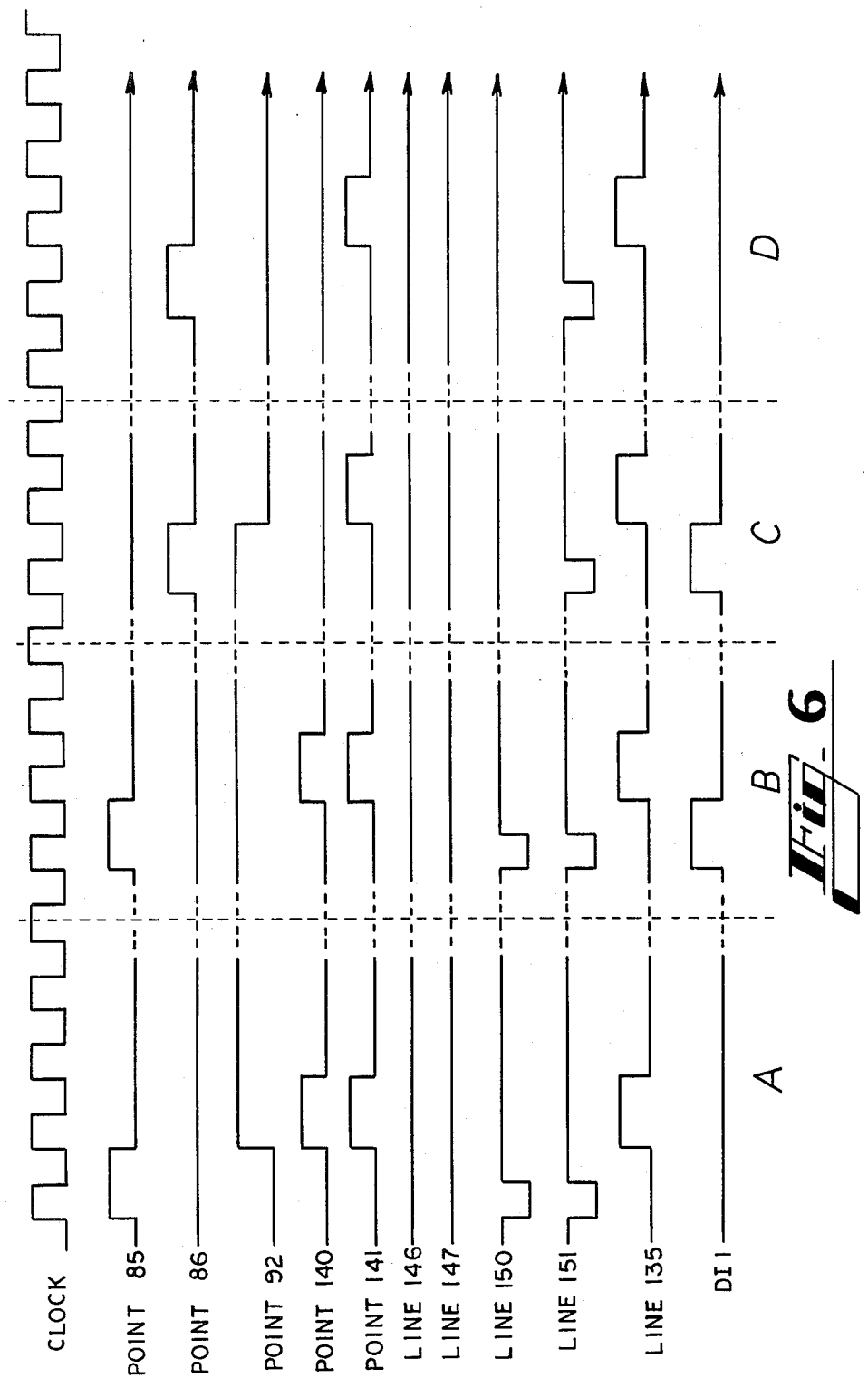

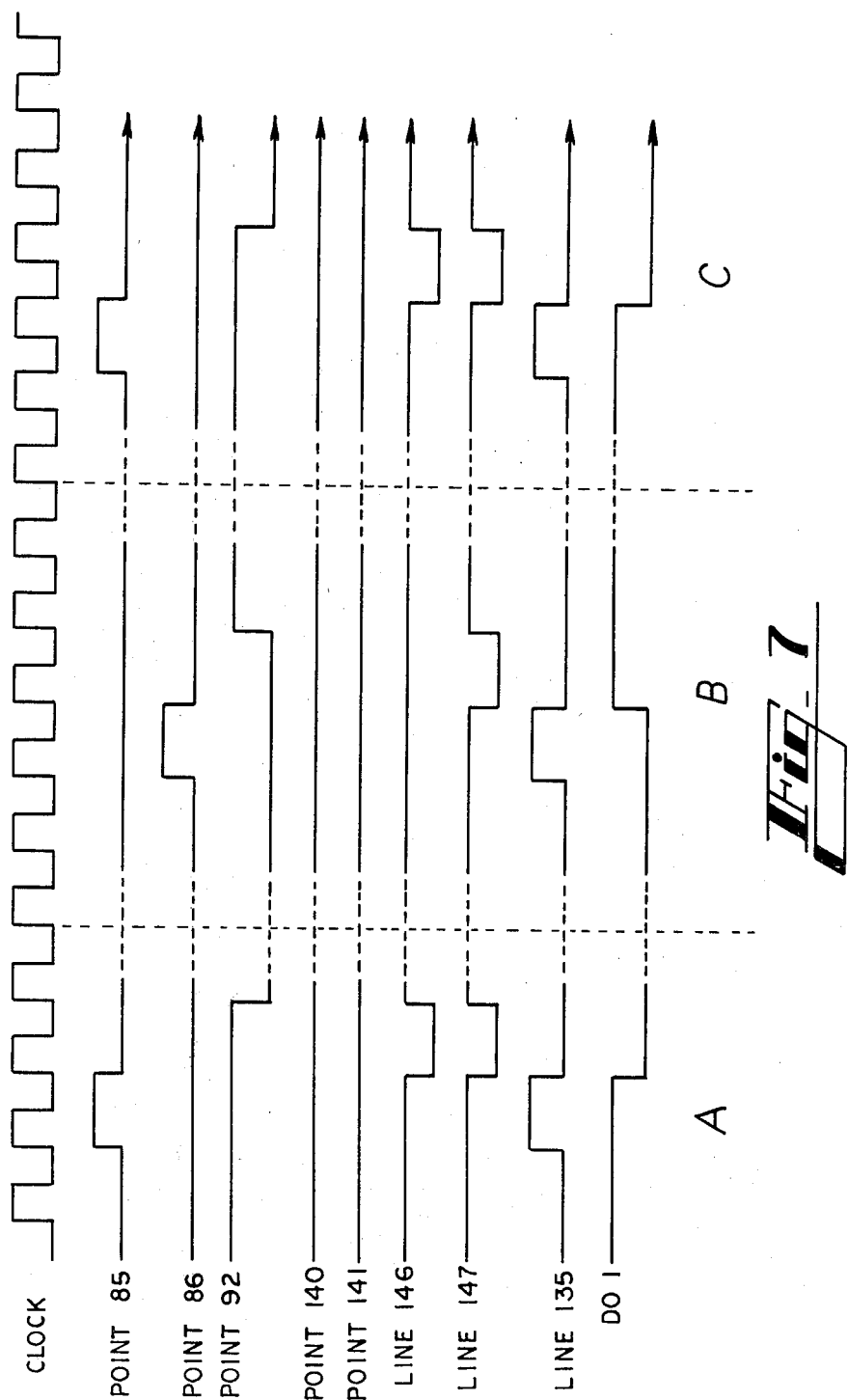

DIGITAL DISPLAY FOR DICTATION TRANSCRIBER FOR INDICATING REMAINING TAPE WITHIN DISCRETE SEGMENTS OF DICTATION

TECHNICAL FIELD

The present invention relates to displays for providing useful information for a transcriber of previously recorded dictation and more particularly relates to a display which will constantly provide a numerical indication of the amount of tape remaining within segments of dictation on a recording medium which are separated and defined by predetermined end and instruction signals.

BACKGROUND OF THE INVENTION

Recent developments in the field of dictation recording and transcribing equipment have included a proliferation of display devices for providing information to both the dictator and transcriber which will aid in orderly dictation and in orderly transcription of recorded dictation.

Generally displays for transcribing devices have included some arrangement for displaying the beginning and the end of recorded dictation and the present location of the transcribe transducer relative to the beginning and end points.

More recently, transcription display systems have been provided which give an indication of the relative locations of predetermined signals such as the locations of instructions or the locations of end marks indicative of the end of a piece of dictation where the prerecorded signals were recorded as part of the dictation process.

Some previous displays for transcribing devices have provided arrays of light emitting elements which show the relative locations of the prerecorded signals as detected during scanning operations performed by rewinding the record medium in a discrete record carrier, such as a tape cassette. Such systems have provided useful displays but the mechanism used therein are referenced from the point at which the transcriber begins rewinding. This arrangement has made it necessary for the device to include either: (1) a mechanically operated slide for indicating the total amount of tape rewound so that a beginning point reference can be created; or, (2) a separate step of justifying the elements of the display upon completion of rewind, for example, as detected by an end of tape motion. One example of the former system is set forth in U.S. Pat. No. 4,051,540 to Wilder et al. and an example of the latter may be seen in U.S. Pat. No. 4,200,893 to Matison.

U.S. Pat. No. 4,352,173 which is assigned to the assignee of the present invention shows an arrangement for having a constantly justified display of the relative locations of the prerecorded signals by virtue of using one end of a display as always corresponding to the farthest point which has been reached during rewind. The arrangement shown in U.S. Pat. No. 4,352,173 has therefore overcome the disadvantage of requiring a separate justification step after a complete rewinding of the record medium.

However, the arrangement of U.S. Pat. No. 4,352,173 and U.S. Pat. No. 4,200,893 both share a requirement that a memory be provided having a plurality of locations, each of which must correspond to a particular segment of the record medium. This means that for a display having N actuable segments to represent the length of the tape, the arrangement must include a memory device having at least N locations to represent the entire length of the tape. As the resolution of the display increases, so does the number of storage locations required.

For example, the particular arrangement shown in U.S. Pat. No. 4,200,893 shows a memory which is addressed directly off a counter driven by a motion sensing apparatus mechanically linked to the tape transport. Therefore each address of the memory corresponds to a particular segment of the record medium.

While linear displays of light actuable elements which may be constantly illuminated, blinking, or varying in intensity are useful, they have the disadvantage of requiring some type of visual approximation of the distance between some marker indicating the present location of the transcribe transducer and the next upcoming mark or marks. Furthermore, it has been found to be basically impractical to include more than sixty actuable segments in a linear display designed to be used with a standard tape cassette holding thirty minutes of dictation on one side. Thus resolution of the display has been limited to half minute increments.

U.S. Pat. No. 4,200,893 makes a passing suggestion that a plurality of digital numerical readouts be used to indicate the absolute distance from the beginning of the tape to certain detected prerecorded signals, such as instruction signals which were detected during a previous rewinding operation. This coupled with an arrangement which shows a numerical indication of the present location of the transcribe transducer relative to the beginning of dictation can provide an indication of how far the tape must be advanced until the next signal is reached. This arrangement still requires a subtraction calculation on the part of the user in order to determine the difference between the numbers in the present location display and the next position of a prerecorded signal.

SUMMARY OF THE INVENTION

The present invention overcomes the above mentioned disadvantages of other transcription display devices. More specifically, the present invention provides a direct numerical readout of the number of dictation segments (defined by prerecorded end marks) which lie between the present location of the transcribe head and the point at which a rewind scan operation began, the number of instruction signals yet to be encountered (in the forward direction) within the present segment, a direct numerical readout of the time remaining within the present segment, and the time remaining until the next instruction signal is encountered within the present segment.

Additionally the preferred forms of the present invention provide for a blanking of the time to next instruction read out when the last instruction within the present segment has been reached.

It is an object of the present invention to provide a transcription display device employing an addressable memory in which addresses of the memory are loaded sequentially only upon the encountering of a prerecorded indicia signal, such as an end mark or an I mark. This provides a memory scheme which only requires a number of addressable locations suitable to hold what is considered to be the maximum number of prerecorded indicia signals to be encountered during transcription of any one record member.

It is still another object of the present invention to provide the above mentioned numerical outputs in a manner for which the outputs are valid for a random sequence of rewind and forward operations executed by the user. This arrangement allows the display to always be referenced to the end of the segment of dictation in which the transcribe transducer is presently located and provides a direct readout relating to the remaining playing time within that segment so that the transcriber may accurately ascertain how long transcription of the segment will take.

In the preferred form of the present invention the numerical displays are derived from up/down counters which are linked to the transport of the transcription device and therefore give a down count in real time as transcription proceeds toward the end of the present segment. Upon any entry during rewind into a new segment, information for the previous segment is written into memory and an address counter which relates to the number of marks encountered during rewind is incremented. As rewinding continues, the counters of the present invention continue to be incremented until the next end mark is encountered which causes data for that segment to be stored in memory and to increment the address counter.

During forward operations, that is, either listen or fast forward, information for each segment is read out of the addressable memory and loaded into the counters driving the displays as each mark is encountered while tape is traveling in the forward direction. Since the present invention provides digital data which is referenced to the end of the present segment in which transcription is taking place; it provides a simple and advantageous scheme for automatically advancing the tape to within a predetermined distance of the beginning of the next segment. By use of this scheme, a particular predetermined distance from the beginning of the next dictation segment at which the fast wind operation is to be terminated may be selected from the front panel. This arrangement allows some "slack" for the inevitable inertia of the mechanical tape transport and therefore prevents overrunning of the beginning of the next segment which is encountered in conventional systems which must wait until detection of the predetermined indicia in order to terminate a fast wind mode.

Therefore it is an object of the present invention to provide an arrangement for implementing a function for rapidly advancing tape to the beginning of the next segment without overrunning the beginning of the segment. It is of course possible also to advance to the beginning of the next instruction without overrunning same.

Therefore it is an object of the present invention to provide an economical display for a dictation transcriber which provides direct numerical readout of the distance between the present location of the tape and prerecorded indicia.

It is a further object of the present invention to provide such a readout which requires no steps of substraction or visual approximation from linear scales in order to ascertain the remaining distance to the prerecorded indicia.

These and other objects of the invention will become apparent from the detailed description to follow.

BRIEF DESCRIPTION OF THE DRAWINGS

FIGS. 3A and 3B show a preferred embodiment for the circuitry to generate the two pairs of three digit readouts on the lower portion of the display output of FIG. 1.

FIGS. 5A and 5B shows a timing diagram for certain points in the circuitry of FIG. 2.

FIG. 6, including A-D, shows a timing diagram of certain wave forms present in the circuitry of FIG. 3 during a rewind scan operation.

FIG. 7, including A-C, is a timing diagram of certain wave forms present in the circuitry of FIG. 3 during forward listen or fast forward operation of a transcriber embodying the present invention.

DETAILED DESCRIPTION

Turning now to the figures in which like numerals represent like parts, the preferred embodiment of the present invention which fulfills the objects set forth above may be seen.

Figure 1:
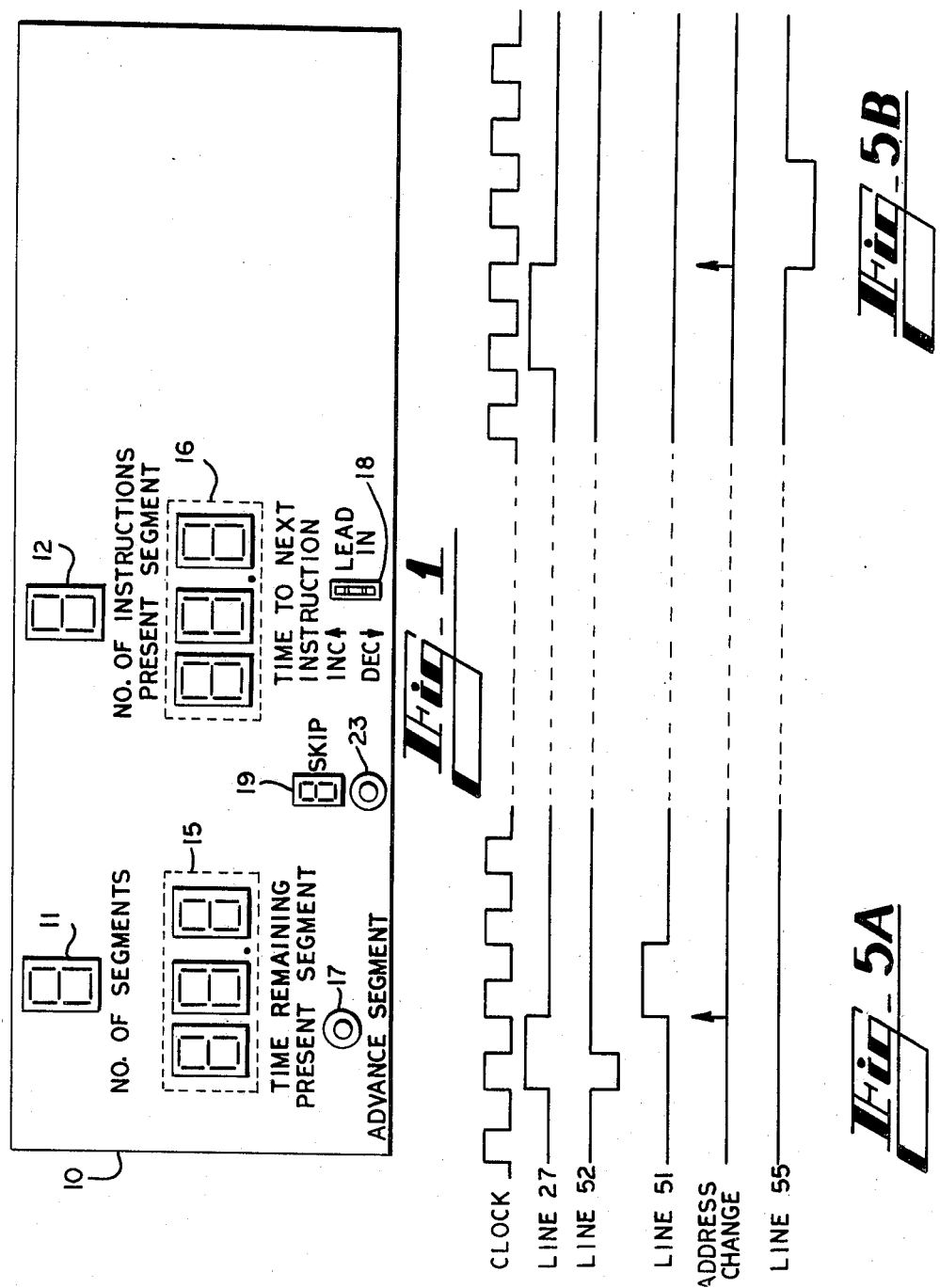
FIG. 1 shows the output of the display of the present system and a pair of controls on a portion of a front panel for an embodiment of the present invention.

Turning first to FIG. 1, a portion of a display panel 10 which would be visible to a user of the present invention is shown. This panel includes five sets of conventional seven segment numerical display elements 11, 12, 15, 16 and 19. It will be appreciated that these segments may be embodied by any conventional arrangement for producing a seven segment read out such as light emitting diodes or liquid crystal displays and may also be embodied by other numerical display arrangements including dot matrix and stepping motor operated devices.

As may be seen from the printed indicia on panel 10, display element 11 gives a one digit readout of the number of segments which appear between the present location and the end of recorded dictation on a record member being transcribed. Display element 12 gives a numerical readout of the number of prerecorded instruction signals which appear between the present location of the transcribe transducer and the end of the present segment of dictation.

Display element 15, which is preferably embodied as a three section seven segment display, shows the time required to advance the untranscribed tape at normal forward speed between the present location of the transcribe transducer and the end of the present segment.

Display element 16 is identical in form to display element 15 and will display the time required, at normal forward tape speed, to move from the present position to the next instruction signal within the present segment. As will be apparent from the following description of the circuitry controlling the display elements of FIG. 1, display element 16 will be blanked when there are no instruction signals remaining between the present location of the transcribe transducer and the end of the present segment of dictation.

Also shown on panel 10 of FIG. 1 is a pushbutton switch 17 which is labeled advance segment. Switch 23 may be pressed a number of times by the operator to skip any number of segments prior to operation of advance segment switch 17. Display element 19 displays the number of times switch 23 has been operated. A thumbwheel switch 18 is used to select a lead in time function in association with operation of switch 17 is also shown. The function of switches 17, 18 and 23 will be explained in detail in connection with the circuitry of FIG. 4.

It is to be understood that the present invention is designed to be used in an otherwise conventional dictation transcription device, for example, a device for transcribing dictation recorded on C-60 Philips-type cassettes.

It will therefore be appreciated that the environment of the present invention includes machinery having a conventional tape transport (not shown) for moving a record medium (not shown), such as the tape within a conventional cassette, alternately in a first direction and in a second and opposite direction.

Also the conventional environment of the present invention will include a transcribe transducer, conventionally a playback magnetic head, and associated amplifiers.

It will therefore be appreciated that these particular features of a dictation transcriber embodying the present invention are not shown in the drawings herein as they are conventional in nature and familiar to those of ordinary skill in the art.

It will further be appreciated that the preferred embodiment of the present invention is useful for transcribing recorded dictation which also includes recorded indicia signals of a predetermined nature which are used to denote various events in the recorded dictation. In the preferred embodiment described herein, it is contemplated that the recorded dictation includes two distinct types of recorded indicia signals, a first type which denotes the end of segments of dictation, for example the end of a particular letter or document; and a second type which denotes that the recorded verbage about to be encountered is in the nature of an instruction and is not to be transcribed by the user.

It is of course possible to advantageously use an embodiment of the present invention wherein only one type of predetermined indicia signal is recorded and also construct an embodiment responsive to more than two distinct types of such signals.

The use of such predetermined recorded indicia for denoting locations of instructions and end of dictation segments is known to those skilled in the art.

Figure 2:
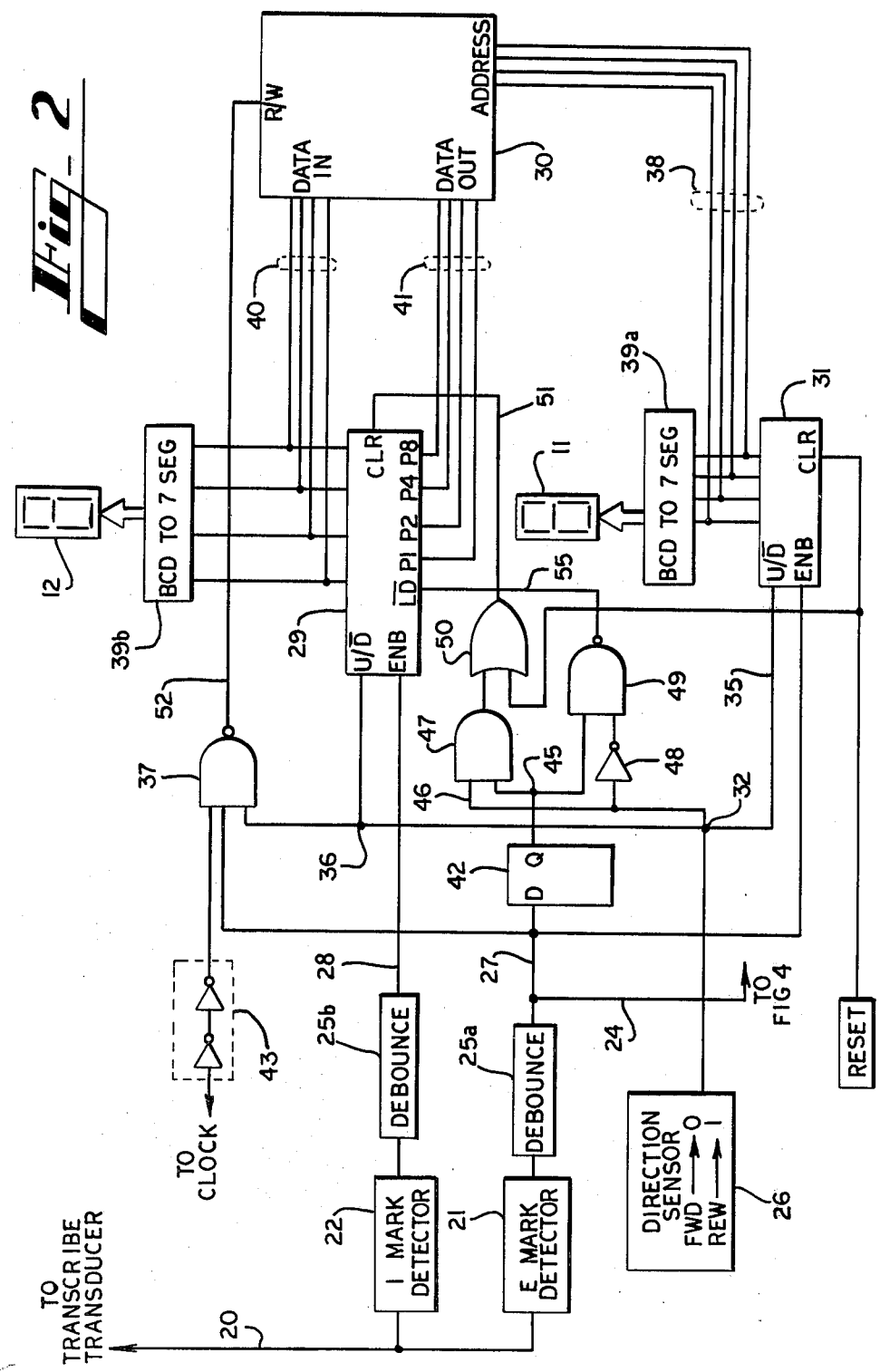
FIG. 2 shows a portion of the preferred embodiment which drives the upper two seven segment readouts on the display panel of FIG. 1.

Turning now to FIG. 2, the circuitry for generating the displays and display segments 11 and 12 as shown in FIG. 1 will be described. The input to the circuitry of FIG. 2 appears on line 20 which will be understood to be connected to the transcribe transducer and appropriate associated amplifiers (not shown) for reproducing signals recorded on the record medium which carries the recorded dictation. Line 20 is input to E mark detector 21 and I mark detector 22.

It will be understood that detectors 21 and 22 are each constructed and arranged to detect one particular type of indicia signal recorded on the tape and are further constructed and arranged to detect such signals at either normal tape transcription speed or during any fast wind mode. Such detectors for predetermined indicia signals are known to those skilled in the art and are not described in detail herein.

The outputs of detectors 21 and 22 are connected to conventional synchronous debounce circuits 25a and 25b. It will be understood that debounce circuits 25 are conventional in nature and provide an output which is one clock period wide in response to detection of a positive transition on their inputs. Such synchronous debounce circuits are conventional in nature, may easily be constructed with a pair of D-type flip-flops and a two input logic gate and will not be described in detail herein.

In connection with the clock to be used in the present invention, it is to be understood that all synchronous circuitry shown in FIGS. 2 and 3 including all flip-flops, synchronous debounce circuits 25, and all counters, have clock inputs which are tied to a common high speed clock. It will thus be appreciated that the arrangements of the preferred embodiment are synchronous in nature.

For the sake of simplicity, all of the clock connections to the synchronous elements in FIGS. 2 and 3 have been omitted except for certain indications particular that gates which are connected to the clock which is not otherwise shown.

The debounced outputs from detectors 21 and 22 are provided along lines 27 and 28, respectively. A conventional direction sensor 26 also provides an input to the circuitry of FIG. 2. As shown on FIG. 2, direction sensor 26 provides a logical zero output when tape is moving in the forward direction and the logical one output when tape is being rewound. It will therefore be appreciated that the preferred embodiment of the present invention is sensitive to whether tape is traveling in a first direction which corresponds to the direction in which dictation was recorded or in a second direction opposite the first direction which conventionally corresponds to rewind.

The circuitry of FIG. 2 comprises a counting and memory arrangement comprising counter 29 and conventional random access memory 30 which drives display element 12 showing the number of instruction signals in the present dictation segment. A second counting arrangement comprising counter 31 count the dictation segments as defined by the encountered E marks on the tape.

It is assumed in the preferred embodiment of the present invention that a record member such as a tape cassette containing recorded dictation is provided to a transcriber using an embodiment of the present invention. Thus the tape will be provided to the transcriber in a condition in which it is wound in a forward direction to the end of dictation. Conventionally the transcriber will engage the record member with the tape transport (not shown) and begin rewinding the tape toward the beginning of dictation. Also in a conventional manner, the first mark to be encountered by the transcribe transducer during such a rewind operation will be the end mark denoting the end of the last segment of dictation.

As rewinding proceeds, subsequently encountered E marks and I marks are detected by detectors 22 and 21, respectively.

The output of direction sensor 26 is connected to point 32 which in turn is provided along line 35 to the up/not down (U/D) input of up/down counter 31. It will be appreciated that up/down counters 29 and 31 are conventional in nature and include an up/not down input (U/D) to control the direction of counting, enable (ENB) inputs which will enable the counters to count, synchronous clear (CLR) inputs for clearing the counters and negated load (LD) inputs for loading counters from their parallel inputs (P1–P8).

It is apparent that such counters are conventional in nature and may be embodied by readily available integrated circuits or constructed from a straightforward combination of integrated circuit counters with appropriate gating which will be apparent to those of ordinary skill in the art.

The direction indicating signal from point 32 is also provided to point 36 which is connected to the up/not down input of counter 29 and is one input to NAND gate 37.

The basic arrangement of the circuitry of FIG. 2 is to count the number of segments with counter 31 by counting the number of E marks detected by detector 21 and to display this count in display element 11. This count is also used as the address input to RAM 30 as provided along four bit data bus 38 to the address inputs of ram 30. Therefore each address of ram 30 is associated with a particular segment of recorded dictation, as defined by the space betwen sequential end marks.

Each time an I mark is detected by detector 22 during rewinding, I mark counter 29 counts same and the number will be displayed in display 12. It is to be noted that displays 11 and 12 are driven by conventional BCD to seven segment drivers 39a and 39b.

The count of the number of instruction signals present in counter 29 is provided at the DATA IN inputs of RAM 30 by four bit data bus 40. The DATA OUT outputs of RAM 30 are connected by four bit data bus 41 to the parallel inputs of counter 29 (P1-P8).

It will be apparent to those skilled in the art that the remaining steering logic on FIG. 2 provides the following function. Each time an end mark is detected by detector 21 the count of the number of I marks which have been previously counted (prior to detection of the end mark) will be stored in counter 29. The steering logic writes this number of I marks into an address of RAM 30 which is associated with the segment of dictation just exited and causes I mark counter 29 to be cleared.

After this occurs, the I marks in the next segment of dictation are counted and in a similar manner. When the E mark denoting the end of that particular segment of dictation is encountered, the number of I marks therein as embodied by the state of data bus 40 is written into the next sequential address of ram 30.

During forward operations, either normal speed transcription or fast forward, the appropriate data is read out of RAM 30 each time a new dictation segment is entered and loaded via bus 41 into counter 29 to display the number of I marks within that segment. As forward operation continues and the I marks are reached, as detected by detector 22, counter 29 will decrement since it will be enabled each time a pulse appears on line 28 indicating an I mark has been detected and point 36 will be at a zero logic level as provided by direction sensor 26.

In the preferred embodiment shown in FIG. 2, it will be appreciated that during rewind writing into RAM 30 takes place prior to incrementing of the address on line 38 and that during forward movement of the tape the address on bus 38 as controlled by counter 31 is decremented prior to the loading of data into counter 29.

Note that delay flip-flop 42 provides a pulse to point 45 one clock period after a pulse appears on line 27. Thus a pulse at point 45 may be considered to be a delayed E mark signal.

Since point 32 provides one input along line 46 to AND gate 47 and also provides an input to inverter 48 which in turn provides an input to NAND gate 49, it may be seen that the appearance of a pulse at point 45 has the effecting of strobing gates 47 and 49, one of which will provide an active output depending on the state of point 32 which, in turn, depends on the direction in which the tape is traveling. When the tape is being rewound and an E mark is encountered, AND gate 47 will provide an output which passes through OR gate 50 to line 51 causing counter 29 to be cleared. Since the clear (CLR) input to counter 29 is synchronous and the input to AND gate 47 is delayed by D flip-flop 42, it will be appreciated that counter 29 clears two clock periods after the rising edge of the pulse on line 27 which denoted detection of an E mark.

In the meantime, it will be appreciated that NAND gate 37 has caused a negative going write strobe to be provided along line 52 to the read/not write (R/W) input of RAM 30. Delay element 43 is provided to compensate for gate and flip-flop delays from debounce circuit 25a.

During forward operation of the tape transport, a pulse at point 45 will cause NAND gate 49 to become active providing a logical zero on line 55 which thus activates the synchronous negated parallel load (LD) input to counter 29 loading the data from four bit bus 41 into the counter.

The timing of this sequence is illustrated in FIGS. 5A and 5B. FIG. 5A shows the writing sequence which occurs during rewind. Note that NAND gate 37 also has one input tied to the system clock which thus assures that line 52 will go low only during the positive half of the clock wave form which may be seen at the top of FIGS. 5A and 5B.

As may be seen in FIG. 5A, the negative write strobe is provided when line 27 goes high in response to detection of an E mark by detector 21. Conventionally data will be written into RAM 30 on the rising edge of the write strobe on line 52 as illustrated in FIG. 5A.

Line 51 will go high one clock period after line 27 initially goes high and counter 29 will be cleared at a time which corresponds to the falling edge of the pulse on line 51 shown in FIG. 5. The spike on the address change line as shown in FIG. 5A indicates that the enable input to E mark counter 31 from line 27 will cause the count of counter 31, and thus the address provided to RAM 30, to change a half clock period after the rising edge of the write strobe on line 52 thus assuring adequate settling time after the write strobe before the address on bus 38 is changed.

FIG. 5B illustrates the wave forms present when an E mark is detected during forward motion of the tape indicating that a new dictation segment has been entered. Again the pulse on line 27 which may be seen to be one clock period wide is indicative of detection of an E mark by detector 21. Line 52 will remain high as no writing of data is to take place.

As may be seen from the spike on the address change line of FIG. 5B, counter 31 decrements upon the falling edge of the pulse on line 27 at the same time a negative pulse on line 55 appears at the synchronous load (LD) input of counter 29. The zero on line 55 conditions counter 29 to load from its parallel inputs the data present on bus 41 upon the next rising edge of the clock and thus counter 29 is loaded at the point indicated on the rising edge of the signal on line 55. Therefore loading of the counter takes place one clock period after the address of RAM 30 has been changed by the decrementing of counter 31.

It will be apparent therefore that the circuitry of the preferred embodiment as shown in FIG. 2 for controlling segments 11 and 12 is arranged to provide an addressable memory 30, the address of which is controlled by the number of a particular type of indicia signals, in this case E marks, which have been detected on the record medium containing the recorded dictation. It is apparent from the use of four bit BCD as illustrated in FIG. 2 that the preferred embodiment contemplates that no more than nine segments of dictation will be contained on one side of a record medium used with the present invention and furthermore that no more than nine instructions will appear in any one segment. This allows the use of a sixteen word by four bit RAM 30 of conventional construction to store the number of instructions within each segment. It will be appreciated by those skilled in the art that embodiments of the present invention using multidigit display in place of segments 11 and 12 may be constructed.

It is to be noted that as tape advances in a forward manner, counter 29 will be decremented each time an I mark is encountered and thus the number appearing in display 12 will always represent the actual number of I marks which have yet to be encountered in the forward direction in the present dictation segment. It will further be apparent from this arrangement that the transcriber may advance or rewind the tape in any random fashion and that the numbers appearing in display elements 11 and 12 will always represent the number of segments between the present location and the end of dictation, and the number of I marks yet to be encountered in the present segment. These quantities will be indicated without regard to the sequence or duration of forward and rewind operations which have been performed by the transcriber. During rewind, information from I counter 29 will always be written into RAM 30 as E marks are detected and during forward advance of the tape, information from RAM 30 will always be loaded into counter 29 in response to entry into a new dictation segment.

Figure 3B:
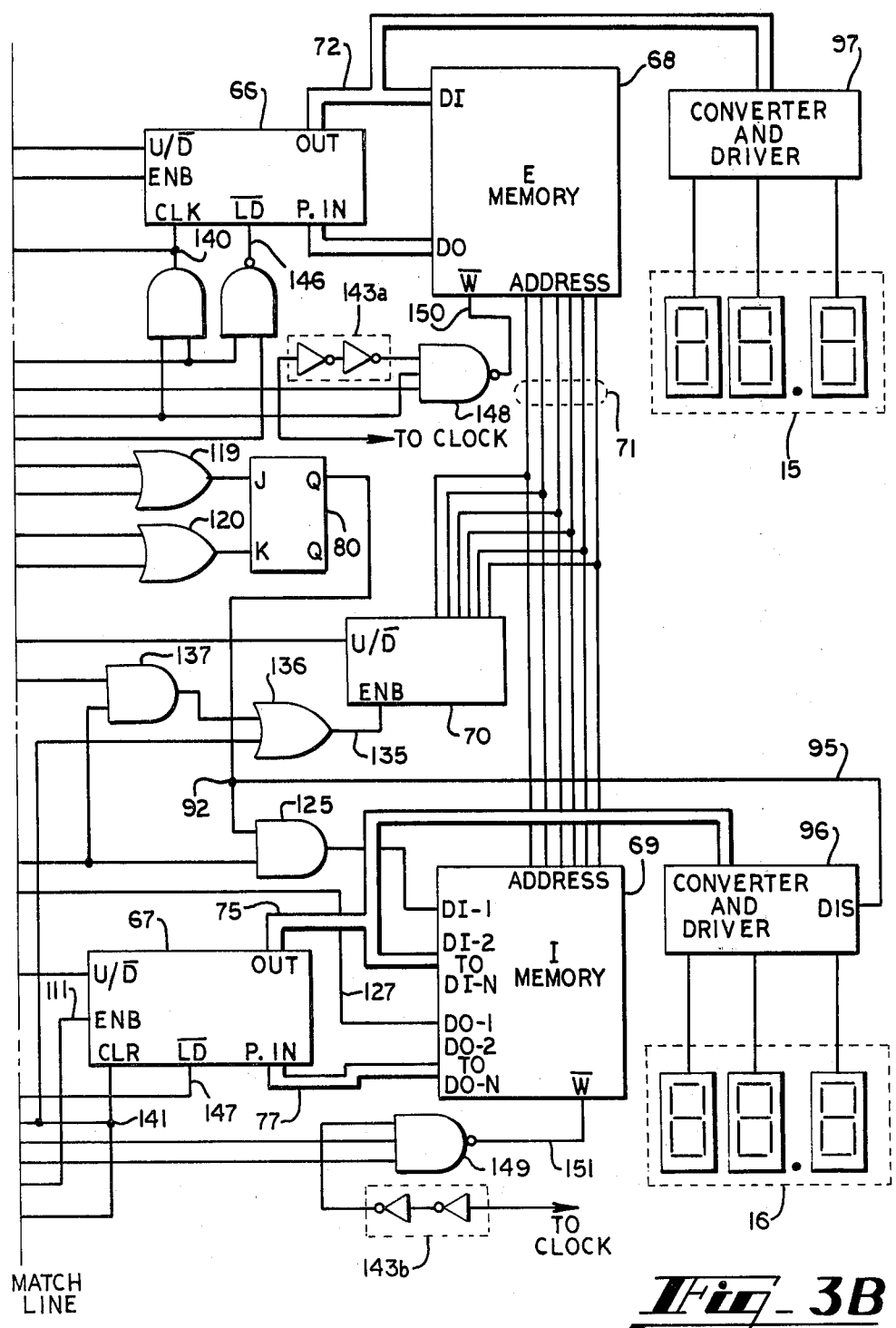

Turning next to FIG. 3 (comprising FIGS. 3A and 3B), the preferred embodiment of the circuitry controlling display segments 15 and 16 as seen in FIG. 1 is shown.

Detectors 21 and 22 and direction sensor 26 are identical to those same components shown in FIG. 2. Likewise with debounce circuits 25a and 25b of which debounce circuit 25c is another example.

The circuitry controlling display 15 and 16 derives its inputs from detectors 21 and 22 and a light chopper arrangement 60 which is coupled to a spindle of the conventional tape transport (not shown) as indicated by dashed line 61. Light chopper 60 is a known circuit for translating rotary motion of the tape spindle into electrical pulses which are synchronized and debounced to give a pulse one clock period wide on line 62 in response to each pulse from light chopper 60. Light chopper 60 may be embodied for example by a light chopper of the type shown in U.S. Pat. No. 3,820,101 which is assigned to the assignee of the present invention. It will therefore be appreciated that the number of pulses appearing on line 62 is proportional to the amount of the record medium which has been moved past the transcribe transducer by the transport. It should generally be understood that the outputs from light chopper 60 provides signals which are counted by counters 66 and 67 and that the outputs of these counters are written into and out of memories 68 and 69 as the record medium is moved back and forth by the transport. The outputs of counters 66 and 67 are the information displayed by display elements 15 and 16.

The address for addressable memories 68 and 69 is derived from up/down counter 70 which, as will become apparent from the description below, is incremented and decremented according to the total number of indicia signals (E marks or I marks) which pass the transcribe transducer.

It will therefore be appreciated that the circuitry shown in FIG. 3 also employs addressable memories which are addressed in accordance with the number of predetermined indicia signals encountered on the tape and do not require a large number of separate memory locations, each of which corresponds to a segment of the record medium. As may be seen from FIG. 3, address bus 71 is preferably six bits wide corresponding to a memory length of sixty-four words for each of memories 68 and 69.

A general description of the circuitry of FIG. 3 is as follows: during a rewind scanning of the tape, counters 66 and 67 count signals derived form light chopper 60 which are proportional to the length of tape which has travelled from a beginning first position past the transcribe transducer. Upon detection of mark by one of detectors 21 or 22, the appropriate count from one or both of counters 66 and 67 is written into memories 68 and 69 and the counters are cleared. Counter 70, which counts the total number of marks encountered, increments the addresses for memories 68 and 69. Therefore as the user of the preferred embodiment of the present invention commences rewinding of the tape, memories 68 and 69 are loaded with counts from counters 66 and 67 corresponding to the distances between E marks and the distances between I marks, or the distance between a first I mark in a segment and the E mark marking the beginning of the segment.

If at any time during operation of the transcribing device, forward motion of the tape is provided, counters 66 and 67 begin to decrement. Upon encountering a mark traveling in the forward direction as detected by detectors 21 and 22, appropriate words from memories 68 and 69 are loaded into counters 66 and 67, respectively, and down counting continues as the tape moves forward.

At any point without regard to the sequence of forward and rewind operations of the tape transport, counters 66 and 67 will carry counts which properly represent the distance between the present location of the tape and the next marks to be encountered if tape is moved in the forward direction. Therefore it is the counts of counters 66 and 67 which are constantly displayed. Each counter has an output which is shown as bus 72 for counter 66 and bus 75 for counter 67. In the preferred embodiment, the count is arranged as three digit BCD and therefore buses 72 and 75 are preferably twelve bit buses.

The data outputs from memories 68 and 69 are carried to the parallel loading inputs of the counters by buses 76 and 77.

It will be apparent from FIG. 3 that the steering logic thereon will implement the functions just described but certain salient details will be pointed out herein. In particular it should be noted that anytime an E mark is encountered during rewind, it will denote the beginning of the dictation segment which has just been rewound and the end of the dictation segment about to be entered. This being the case, each time an E mark is encountered it is necessary to terminate both the count of the length of the segment (the distance between E marks) and the count from the last I mark within the segment to the beginning of the segment (the distance between the last I mark encountered and the E mark marking the beginning of the segment).

At any time during rewind of the tape an I mark is encountered, it is appropriate to write the present count of counter 67 into memory 69 to denote the location of an I mark and to begin counting the distance between that I mark and the next mark to be encountered during rewind.

From the foregoing it should be apparent that it is necessary to write data into memory 69 which stores the distance to the next upcoming I mark (when the tape is moved in a forward direction) when either type of mark is encountered. Thus it will be apparent that the writing of data into memory 69 and the reading of data out of this memory is fundamentally responsive to the detection of either an E mark or an I mark.

Since memory 68 stores the length of dictation segments, this memory and its associated counter 66 are only loaded and cleared in response to detection of E marks.

As may be seen from FIG. 3, the output of detector 21 appears as a pulse one clock period wide at point 85 and the same pulse, delayed by one clock period by the action of D flip-flop 81, appears on line 87. The output of I mark detector 22 appears as a pulse at point 86 and therefore the output of OR gate 88 which appears at point 89 corresponds to detection of either an E mark or an I mark. The appearance of a pulse at point 89 is replicated one clock period later at point 90 by the action of D-type flip-flop 82.

It will be apparent from inspection of FIG. 3 and from the timing diagrams of FIGS. 6 and 7 that D flip-flops 81 and 82 are basically used to control the proper sequence of reading and writing from memory as it relates to incrementing and decrementing address counter 70.

Flip-flop 80 provides a logical one output to point 92 whenever it is set. This output is provided along line 95 to a disable input for converter and driver 96 which drives the three digit seven segment display 16. It will be appreciated that converter and driver 96, and converter and driver 97, comprise conventional circuitry for converting three digit BCD into a three digit seven segment displayed output. When line 95 is high, converter and driver 96 is arranged so as to blank display 16. Therefore whenever flip-flop 80 is set, display 16 will be blanked.

It should be apparent from a short consideration of a random set of E and I marks on a length of recording medium that it is appropriate to blank display 16 whenever the next mark to be encountered if tape is moved in the forward direction (or conversely the last mark encountered during rewind) is an E mark. When the tape is in this configuration with relation to the transcribe transducer, there are no more I marks remaining within the segment and it is therefore appropriate to blank display 16.

Therefore, flip-flop 80 will be referred to as the "last E flag" which refers to the fact that it becomes set anytime an E mark is encountered on rewind and becomes cleared whenever an I mark is encountered on rewind. This means that whenever the last mark encountered during a rewind operation is an E mark, flip-flop 80 becomes set, and thus the name for the flag.

It will be appreciated from the somewhat detailed description below that flip-flop 80 is operated during both forward and rewind operations and that the state of this flag is stored as a separate bit of each word in memory 69 so that the state of the flag may be reproduced during forward movement of the tape.

The outputs of light chopper 60 which appear on line 62 are scaled by scalers 98 and 99, the outputs of which drive counters 66 and 67, respectively. Scalers 98 and 99 comprise conventional up/down counters, the outputs of which appear on lines 110 and 111, respectively, to drive the enable inputs to counters 66 and 67. It should be understood that the outputs on lines 110 and 111 are outputs from the overflow/underflow outputs of conventional up/down counters and that the scale, N, of the counters is selected so that one output on lines 110 and 111 will be produced for each tenth of a minute of tape which is moved at normal speed. It will be apparent to those skilled in the art how to select the scale of the scalers. For example, the preferred embodiment displays the appropriate distances in displays 15 and 16 at tens, ones, and tenths of minutes. Therefore the least significant digit of displays 15 and 16 represents tenths of minutes (six seconds) of tape traveling at a normal speed. Therefore if light chopper 60 is arranged so that it produces K pulses per second of normal tape movement which is scaled by dividing by N (the scale of counters 98 and 99), it will be apparent that $N = 6 \times K$ for the preferred embodiment. For example, if light chopper 60 produces three pulses for every second of tape travel at normal speed, K equals three, and therefore N equals eighteen.

It will therefore be appreciated that counters 66 and 67 increment or decrement by a count of one each time an amount of tape corresponding to six seconds of tape travel at normal forward speed is moved by the transport.

Scalers 98 and 99 are cleared (from points 140 and 141) each time counters 66 and 67, respectively, are cleared. It may be desirable to clear scalers 98 and 99 when tape is moving in one direction and preset to a particular number, or clear on the falling edge of the mark signal to account for the finite length of the prerecorded marks.

The output of direction sensor 26 is provided to point 112 and from there along line 115 to the up/not down inputs of counters 66, 67, 70, 98 and 99. It will therefore be appreciated that all counters in the circuitry of FIG. 3 are controlled according to the direction in which the transport is moving tape and that said counters count up in response to rewinding of the tape and down in response to forward movement of the tape in the preferred embodiment. The logic state at point 112 is inverted by inverter 116 to provide a logical one on line 117 when tape is moving in the forward direction thus activating certain gates shown on FIG. 3 only when tape is traveling in the forward direction.

The last E mark flag 80 has its inputs controlled by a pair of OR gates 119 and 120. Each of these OR gates provides a sum of products function, the products being provided by AND gates 121 and 123 for OR gate 119 and AND gates 122 and 124 for OR gate 120. As may be seen from inspection of FIG. 3, AND gates 123 and 124 through line 117, NAND gate 131, inverter 132 and line 130 control the J and K inputs to last E flag 80 during forward movement of the tape and that AND gates 121 and 122 control the J and K inputs of the flag, respectively, during rewinding of the tape.

During rewind, last E mark flag 80 is set each time an E mark is detected by detector 21 and is cleared each time an I mark is detected by detector 22. Note that the DI1 data input of memory 69 is controlled by AND gate 125 which has as its inputs the state of flag 80 and the state of point 89 which goes high anytime a mark is detected. Since, as noted above, the output of counter 67 is written into memory 69 each time an E mark or an I mark is encountered during rewind, the state of flag 80 will be written into the DI1 position of each address of counter 69 which is loaded in response to detection of a mark. It will thus be apparent that each time that memory 69 is loaded and the last mark previously encountered (just prior to the mark causing the present writing) is an E mark, a one will be written into the DI1 position of the word in memory 69 storing the count of counter 67. This means that when the tape encounters the same mark coming in a forward direction and this particular word is read out of memory 69, the presence of a logical one at the DO1 data output of memory 69, which appears on line 127, will indicate that the next mark to be encountered in the forward direction is an E mark. From this it follows that there are no more I marks in the present segment of tape.

When a one is read out of DO1 when tape is traveling in the forward direction, the logical one on line 127 will be inverted by inverter 128 which prevents AND gate 124 from providing a logical one. When this occurs, the logical one from line 127 will appear on line 129 as an input to AND gate 123 which will subsequently, upon encountering a signal on line 130 from point 90, strobe AND gate 123 causing last E mark flag 80 to be set. Address counter 70 is enabled by the signal on line 135 which is derived from OR gate 136. OR gate 136 is activated by the output of AND gate 137 during forward movement of the tape and AND gate 138 during rewinding of the tape.

Counter 66 is conditioned to clear upon the next clock pulse when point 140 becomes a logical one and counter 67 is conditioned to clear when point 141 is in a logical one state. Similarly, counter 66 is conditioned to load when line 146 is in a logical zero state and counter 67 is conditioned to load when line 147 is in a logical zero state. Writing of data into memories 68 and 69 is controlled by NAND gates 148 and 149, respectively, the outputs of which appear on lines 150 and 151.

From inspection of FIG. 3 it will be apparent that NAND gates 148 and 149 each have the master clock signal as one input and therefore can become active only during the positive position of the clock signal. Delay elements shown as 143a and 143b are provided to prevent a race condition among the inputs to gates 148 and 149.

From further inspection of FIG. 3, it will become apparent that NAND gate 148 causes data to be written into memory 68 when an E mark is detected when tape is being rewound and that NAND gate 149 causes data to be written into memory 69 when any mark is detected when tape is being rewound.

In view of the foregoing description of the structure of the circuitry of FIG. 3 controlling displays 15 and 16, the operation of the circuitry may be readily appreciated from examination of FIG. 3 in conjunction with FIGS. 6 and 7 which are timing diagrams of various signals of the circuitry on FIG. 3 during rewinding and forward operation of the tape, respectively.

The timing diagram of FIG. 6 is divided into four subsections A–D which show the signals generated within FIG. 3 during rewind for the four possible combinations of the state of the last E mark flag 80 shown as the output at point 92, and the type of mark detected (points 85 and 86).

It may be seen from inspection of the outputs on the write lines (lines 150 and 151) and the enable address counter signal which appears on line 135 that, during rewind, writing takes place in a location defined by the current address on bus 71 when a mark is detected and the address is subsequently changed. It will be apparent that the address will change on the falling edge of the signal on line 135 which corresponds to the rising edge of the next clock period after the logical one on line 135 has conditioned the address counter to increment. It will also be apparent that clearing of counters 66 and 67 takes place after the immediately preceding count from these counters has been written into the memories.

Note in section A of FIG. 6 that the previous mark had to have been an I mark due to the fact that point 92, the state of the last E flag, is zero. It may be seen from inspection of this section of FIG. 6 that the flag becomes set in response to the E mark which appears at point 85 in subsection A of FIG. 6 after writing into the memory has taken place.

It will further be appreciated that in subsection B the state of point 92 is such that the DI1 input to memory 69 goes high prior to the writing of the data into memory 69. As will be appreciated by those skilled in the art, the write pulses which appear on line 151 latch the data into the memory on the rising edge of the negative pulses which are shown in FIG. 6.

Turning to FIG. 7, subsections A and B illustrate the loading of counters 66 and 67 from memories 68 and 69 in response to the detection of an E mark (in subsection A) and in response to an I mark (in subsection B) during forward movement of the tape. It may be seen from inspection of FIG. 3 that line 135 enables address counter 70 to count prior to the loading of the counters which is controlled by lines 146 and 147. Address counter 70 will count on the falling edge of the pulses which appear on line 135 in FIG. 7. The counters will load on the rising edge of the negative going pulses which appear on lines 146 and 147 and therefore the address counter will first be decremented and then loading into counters 66 and 67 will take place.

Note also from the wave form for output DO1 of memory 69 and the wave form shown for point 92 (the state of the last E mark flip-flop) on FIG. 7; during forward movement of the tape the last E flag is strobed and set or cleared according to the state of the DO1 output after the address counter 70 has been decremented.

As may be seen from inspection of FIG. 7, subsection A, both counters are loaded upon each occurrence of an E mark so that information pertaining to the distance to the next E mark and the next I mark will be displayed. When an I mark is encountered, only counter 67 is loaded as may be seen from lines 146 and 147 in subsection B. This is because the occurrence of an I mark requires only that the distance to the next I mark within the segment as displayed in display segment 16 be changed and that display segment 15 should continue to be decremented as counter 66 is decremented.

From the foregoing description of the present invention, it will be apparent that the E marks and I marks recorded on the recording medium comprise two distinct types of indicia signals which are detected by detectors 21 and 22 as the record medium moves past the transcribe transducer.

It will further be apparent that counter 70 comprises an up/down counting means which provides a count of the indicia signals as the record medium moves past the transcribe transducer and further provides address signals on bus 71 which correspond to the count.

Furthermore, the combination of light chopper 60 and scalers 98 and 99 comprise a motion means for providing motion signals on lines 110 and 111 in response to predetermined increments of the record medium moving past the transcribe transducer. It will be appreciated that each of counters 66 and 67 comprise up/down counting means for counting these motion signals and that each of these counters provides a count. Also displays 15 and 16 provide displays of the counts of counters 66 and 67.

The steering logic is embodied by the gates and delay flip-flops 81 and 82 shown in FIG. 3 comprise a control means for storing the counts of up/down counters 66 and 67 in addressable memories 68 and 69 in response to detection of the indicia signals moving past the transducer when direction sensor 26 indicates that tape is being moved past the transcribe transducer in a direction opposite that in which the dictation was originally recorded. Similarly, lines 146 and 147, direction sensor 26, and D flip-flops 81 and 82 further comprise a control means for loading data from addressable memories 68 and 69 into counters 66 and 67, respectively, when tape is moved past the transcribe transducer in the same direction upon which dictation was originally recorded.

Figure 4:
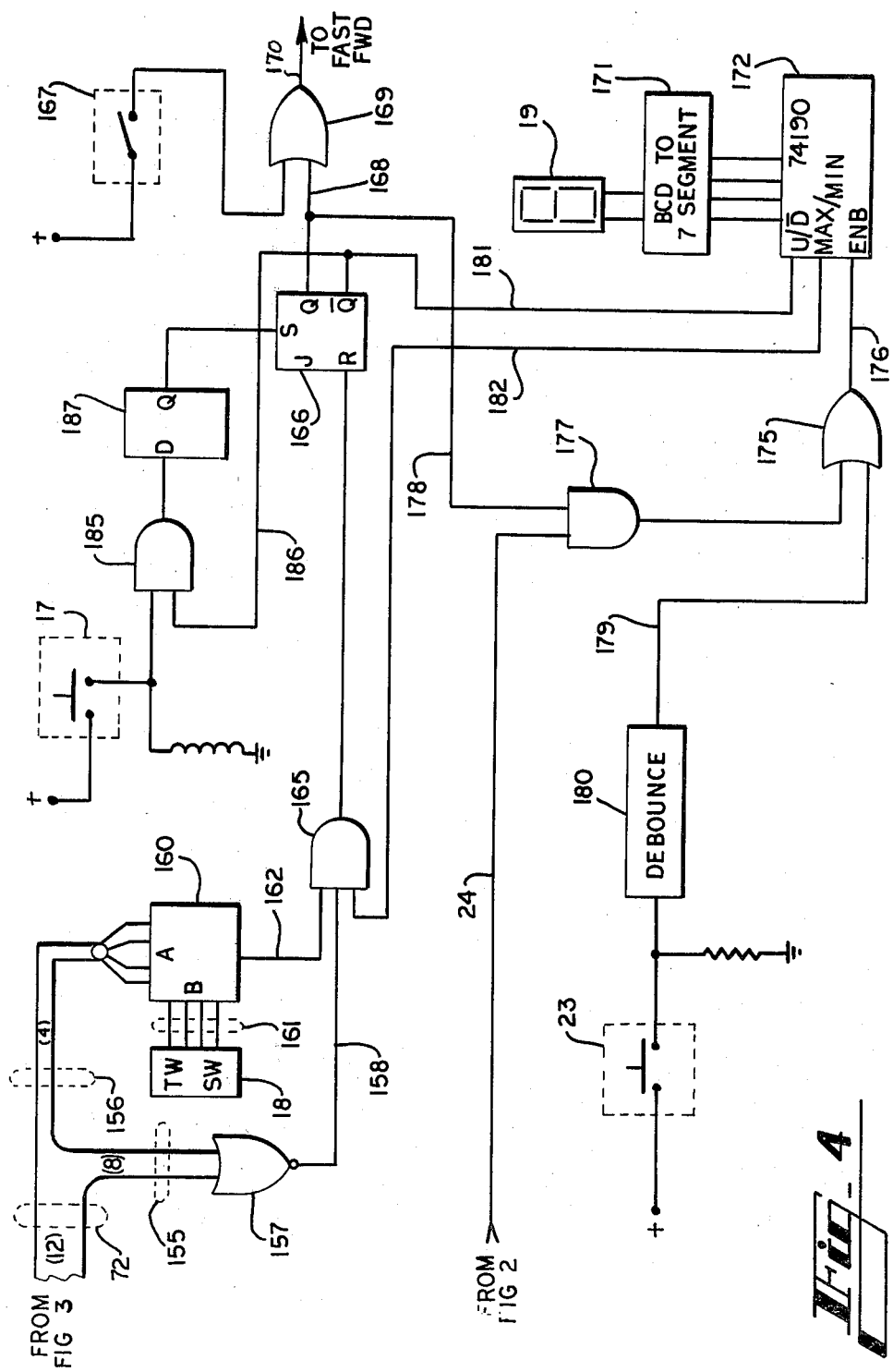
FIG. 4 shows a preferred embodiment of the nonoverrunning advance to next mark arrangement of the present invention.

Turning now to FIG. 4, yet another advantage of the present invention will be illustrated. By the arrangement of the present invention as shown in FIG. 3, it is possible to provide a simple and inexpensive apparatus for overcoming a disadvantage of previous systems for advancing tape in a forward direction to a predetermined point.

In the past, various types of forward resetting or move to farthest advance circuits have been known but have several drawbacks. Most conventional forward reset circuits require actual detection of the signal delimiting the location on the tape to be reached prior to generating a signal to terminate movement of the record medium. Due to the inherent inertia of the mechanical transport, this arrangement necessarily means that a fast wind to a predetermined point arrangement will overrun the location at which it is desired to stop.

A move to farthest advance arrangement is shown in U.S. Pat. No. 4,092,680 which is derived from a counter but the apparatus therein is only able to detect the farthest position to which a record medium has previously been advanced in a predetermined direction and does not suggest any apparatus which may be selectively moved through individual dictation segments defined by predetermined indicia (end signals) so that the transcriber may quickly check for a particular piece of dictation. By using the arrangement of up/down counters for generating a display, the apparatus of the present invention provides an additional feature which overcomes this disadvantage of the prior art and provides an extremely simple apparatus for advancing the record medium of a transcribing machine to the next location of a predetermined recorded indicia signal. The present invention allows a variable lead in time to be selected in order to compensate for distance travelled due to inertia of the mechanical transport after actual powered drive of the transport has been terminated.

Referencing FIGS. 1 and 4 it may be seen that pushbutton switch 17 on FIG. 1 is the same as switch 17 on FIG. 4 and similarly thumbwheel switch 18 on FIG. 1 is a conventional thumbwheel switch 18 as shown on FIG. 4.

The preferred apparatus shown in FIG. 4 is designed to fast wind the record medium to the beginning of a new segment of dictation as denoted by a prerecorded E mark. It is of course possible to use similar apparatus to advance to the next instruction and such an arrangement is clearly within the scope of the present invention.

As may be seen from FIG. 4, twelve bit bus 72 (three BCD digits) is subdivided into a most significant digits bus 155 (8 bits) and a least significant digit bus 156 having 4 bits. NOR gate 157 detects the state of all zeros in the most significant bits appearing on bus 155 and provides a logical one on line 158 when such a condition is detected.

The four bits of the least significant digit which appear on bus 156 are provided as one input to a four bit magnitude comparator 160. The construction of such comparators will be known to those skilled in the art, or comparator 160 may be implemented by means of a type CD4063 comparator currently manufactured by RCA.

Thumbwheel switch 18 is used to select a four bit number which appears on a four bit bus 161 to the other input of comparator 160. The equal (=) output of comparator 160 appears on line 162 as the other input to AND gate 165. The output of AND gate 165 is connected to the K input of JK flip-flop 166, which has its direct set input connected to switch 17 through AND gate 185 and delay flip-flop 187. It is to be understood that the clock input of flip-flop 166 will be connected to the common clock of the apparatus shown in FIG. 3.

A normally open, momentary, fast forward switch 167 is also shown in FIG. 4. The Q output of flip-flop 166 appears on line 168 and, together with the output from switch 167, form the two inputs to OR gate 169, the output of which appears on line 170. A logical one on line 170 will operate appropriate circuitry (not shown) to cause the transport to advance the record medium in a fast forward mode. Switch 167 may manifest itself as a pushbutton switch or a foot operated switch of a conventional transcriber foot control.

By experience the transcribing person will have made an appropriate selection from thumbwheel switch 18 in order to compensate for the normal overrun from mechanical inertia which occurs after powered fast forward drive of the transport terminates. Assume flip-flop 166 is cleared. This condition provides a logical one on line 186 conditioning AND gate 185 to pass outputs from switch 17 to delay flip-flop 187. Operation of switch 17 causes a logical one to appear at flip-flop 187 which appears on the direct set input of flip-flop 166 one clock period later setting same. This event causes a logical one to appear on line 168 which, through the action of OR gate 169, causes a logical one to appear on line 170 latching the apparatus in a fast forward mode. Also, a zero will be present on line 186 rendering flip-flop 166 unresponsive to switch 17 until it is cleared as described below.

As counter 66 (FIG. 3) counts down toward zero, indicating the approach of the next E mark on the tape, the most significant digits of bus 72 as manifested by bus 155 will all become zero and a logical one will appear on line 158. When counter 66 arrives at a count greater than zero but equal to the number on bus 161 as determined by thumbwheel switch 18, the equal output on line 162 of comparator 160 will go high. If it is assumed for the moment that line 182 is high, all inputs to AND gate 165 will be high placing a one at the K input of flip-flop 166.

This event causes the next rising edge of the clock to clear flip-flop 166 terminating the fast forward signal to the transport. Therefore it may be seen that the fast forward signal to the transport is terminated prior to the time that the transcribe transducer actually encounters the next E mark.

However, proper selection of a number by thumbwheel switch 18 will be such that the signal on line 170 will be removed at a time which compensates for continued motion of the record medium due to inertia. Therefore the transport will not overrun the next E mark and, when the transport physically stops, the transcribing person may immediately enter a forward listen mode and will not miss the first portion of dictation which appears in the next segment.

The apparatus of FIG. 4 is also arranged to allow the operator to skip a predetermined number of dictation segments through operation of switches 17 and 23. As may be seen in FIG. 4, switch 23 and seven segment display element 19 correspond to the same elements shown by the notation "SKIP" in FIG. 1. In order to operate this circuitry, the operator depresses switch 23 a number of times which correspond to the number of elements to be skipped. It should be appreciated that when switch 23 is not operated, operation of switch 17 will cause the apparatus to advance to the next segment as described hereinabove. Assuming that the operator wished to skip two segments and advance to the third segment from the present segment, switch 23 should be depressed twice.

As may be seen from FIG. 4, the output of switch 23 is converted to a single pulse by debounce circuit 180 which passes through OR gate 175 to the enable input of counter 172. The output of counter 172 is converted by BCD to seven segment converter 171 to provide a display in seven segment display element 19. When flip-flop 166 is cleared, the output on line 181 conditions counter 172 to count up. Therefore, each operation of switch 23 enables counter 172 to increment by one.

Continuing with the example, two operations of switch 23 cause counter 172 to count to two. Once counter 172 has counted to two, it is appropriate for the operator to depress switch 17. As described hereinabove, the output of switch 17 passes through AND gate 185, delay flip-flop 187, to the direct set input of flip-flop 166 setting same which has the following effect. Line 186 goes low, maintaining the output of AND gate 185 at zero preventing flip-flop 166 from further responding to switch 17. Line 168 goes high causing a logical one to appear on line 170 operating the fast forward mechanism of the tape transport (not shown). Also, line 181 goes to a logical zero conditioning counter 172 to count down.

Since counter 172 is not in its zero or maximum state, line 182 will have a zero thereon preventing any logical one passing through AND gate 165 until counter 172 counts down to zero. As winding proceeds, the first E mark denoting the beginning of the first segment to be skipped is encountered. Line 24 from FIG. 2 is brought in as one input to AND gate 177. As may be seen from FIG. 2, line 24 carries the one clock pulse wide output present on line 27 (FIG. 2) indicating an E mark has been encountered. This pulse will pass through AND gate 177 and OR gate 175 to line 176 enabling counter 172 to decrement by one.

A similar sequence occurs when the E mark denoting the beginning of the second segment to be skipped is encountered. When counter 172 is decremented in response to this particular E mark, it will have decremented to zero and a logical one will appear on line 182 from the max/min output of counter 172. Thus, when the output on bus 72 indicates the approach of a third E mark (that denoting the beginning of the segment at which the apparatus is to stop), the circuitry including comparator 160 described hereinabove will clear flip-flop 166 as described hereinabove. Note that the clearing of flip-flop 166 by virtue of lines 162 and 158 going high will occur prior to the appearance of a pulse on line 24 and thus counter 172 will be prevented from toggling over in a manner that will remove the logical one from line 182.

It will therefore be appreciated that the present apparatus provides a convenient way in which to skip from a present segment to the beginning of a predetermined segment in the tape skipping a predetermined number of interceding segments.

The foregoing specification has described the preferred embodiments of the present invention and will be apparent to those of ordinary skill in the art that other embodiments of the present invention may be constructed within the scope of the claims below.

We claim:

1. In a record playback apparatus for transcribing dictation recorded on a record medium as said record medium was moved in a first direction, said record medium also having first-type indicia signals and second-type indicia signals distinct from said first-type indicia signals recorded thereon; said record playback apparatus including transport means for moving said record medium in said first direction past a transducer and alternately in a second direction opposite said first direction past said transducer, detection means connected to said transducer for providing a first type detection signal in response to one of said first type indicia signals moving past said transducer and for providing a second type detection signal in response to one of said second type indicia signals moving past said transducer; direction sensing means coupled to said transport means for providing a first type direction signal in response to said transport means moving said record medium in said first direction and alternately for providing a second-type direction signal in response to said transport means moving said record medium in said second direction, the improvement of a display comprising:

an addressable memory;

first counting means connected to said detection means for counting said first type detection signals as said record medium moves past said transducer to provide a first count output;

means connecting said first counting means and an address input of said addressable memory for providing an address corresponding to said first count output;

second counting means connected to said detection means for counting said second type detection signals as said record medium moves past said transducer to provide a second count output;

means connecting said second counting means and data ports of said addressable memory control means connected to said detection means, said addressable memory, and said direction sensing means for writing said second count output into said addressable memory in response to each occurrence of one of said first-type detection signals during the concurrent presence of said second-type direction signal and alternately for presetting said second counting means from said addressable memory in response to each occurrence of one of said first-type detection signals during the concurrent presence of said first-type direction signal; and display means for displaying said second count output.

2. The improvement as recited in claim 1 wherein: said display means further comprises means for displaying said first count output.

3. In a record playback apparatus for transcribing dictation recorded on a record medium as said record medium was moved in a first direction, said record medium also having indicia signals recorded thereon, said indicia signals including first-type indicia signals and second-type indicia signals distinct from said first type indicia signals, said record playback apparatus including transport means for moving said record medium in said first direction past a transducer and alternately in a second direction opposite said first direction past said transducer, detection means connected to said transducer for providing a detection signal in response to one of said first type indicia signals moving past said transducer and for providing said detection signal in response to one of said second-type indicia signals moving past said transducer; direction sensing means coupled to said transport means for providing a first type direction signal in response to said transport means moving said record medium in said first direction and alternately for providing a second type direction signal in response to said transport means moving said record medium in said second direction, the improvement of a display comprising:
an addressable memory;
first up/down counting means connected to said detection means and said direction sensing means for providing a first count of said detection signals as said record medium is moved past said transducer;
means connecting said first counting means and an address input of said addressable memory for providing an address corresponding to said first count;
motion means for providing motion signals in response to predetermined increments of said recording medium moving past said transducer;
second up/down counting means connected to said detection means and said direction sensing means for counting said motion signals as said record medium moves past said transducer and for providing a second count; means connecting said second up/down counting means and data ports of said addressable memory;
display means for displaying said second count; and
control means connected to said detection means, said addressable memory and said direction sensing means for storing said second count in said addressable memory in response to each occurrence of one of said detection signals during the concurrent presence of said second type direction signal and for presetting said second up/down counting means from said addressable memory in response to each occurrence of one of said detection signals during the concurrent presence of said first-type direction signal.

4. In a record playback apparatus for transcribing dictation recorded on a record medium as said record medium was moved in a first direction, said record medium having a plurality of indicia signals recorded thereon;
said record playback apparatus including transport means for moving said record medium in said first direction past a transducer and alternately in a second direction opposite said first direction past said transducer;
motion means for providing a motion signal in response to each occurrence of a predetermined increment of said recording medium moving past said transducer;
direction sensing means coupled to said transport means for providing a first-type direction signal in response to said transport means moving said record medium in said first direction and alternately for providing a second-type direction signal in response to said transport means moving said record medium in said second direction;
detection means for providing a mark signal in response to each occurrence of one of said indicia signals moving past said transducer; the improvement comprising:
an addressable memory including a data input and an address input;
first counting means for providing a first count in response to said mark signals; said first counting means counting in a first counting direction in response to each occurrence of one of said mark signals when said first-type direction signal is provided by said direction sensing means and counting in a second count direction in response to each occurrence of one of said mark signals when said second-type direction signal is provided by said direction sensing means;
a second counting means for providing a second count in response to said motion signals; said second counting means counting in said first counting direction in response to each occurrence of one of said motion signals when said first-type direction signal is provided said direction sensing means and alternately for counting in said second counting direction in response to each occurrence of one of said motion signals when said second-type direction signal is provided said direction sensing means;
means connecting said addressable memory, said first counting means, and said second counting means for providing said first count to said address input and said second count to said data input; and
display means for providing a numerical display corresponding to said second count.

5. The improvement of claim 4 wherein:
said addressable memory further comprises a data output;
said second counting means further comprises presetting means including a preset input for forcing said second count to a value determined by said preset input in response to a preset signal; and
control means connecting said data output to said preset input for providing said preset signal in response to each occurrence of one of said mark signals when said first-type direction signal is provided by said direction sensing means.

6. The improvement of claim 5 further comprising:
writing means for writing said second count into said addressable memory at an address corresponding to said first count in response to an occurrence of one of said mark signals when said second-type direction signal is provided said direction sensing means.

7. The improvement of claim 6 further comprising:
clearing means for clearing said second counting means after each operation of said writing means.

8. The improvement of claim 4 wherein:
said transport includes fast winding means responsive to an advance signal for moving said record medium in said first direction and further comprising:
means for providing a lead-in signal;
switch means selectively operable for providing a set signal;
latching means connected to said switch means for latching on said advance signal at an output of said latching means in response to said set signal; and
clearing means responsive to said lead-in signal and connected to said second counting means to clear said latching means removing said advance signal in response to said second count corresponding to said lead-in signal.

9. The improvement of claim 8 further comprising:
skip means responsive to said detection means and selectively operable for rendering said clearing means inoperative until a selected number of said mark signals have been detected by said detection means when said latching means is set.

10. In a record playback apparatus for transcribing dictation recorded on a record medium as said record medium was moved in a first direction, said record medium having a plurality of indicia signals recorded thereon;
said record playback apparatus including transport means for moving said record medium in said first direction past a transducer and alternately in a second direction opposite said first direction past said transducer;
motion means for providing a motion signal in response to each occurrence of a predetermined increment of said recording medium moving past said transducer;
direction sensing means coupled to said transport means for providing a first-type direction signal in response to said transport means moving said record medium in said first direction and alternately for providing a second-type direction signal in response to said transport means moving said record medium in said second direction;
detection means for providing a mark signal in response to each occurrence of one of said indicia signals moving past said transducer; the improvement comprising:
an addressable memory including a data input and an address input;
first counting means for providing a first count in response to said mark signals; said first counting means counting in a first counting direction in response to each occurrence of one of said mark signals when said first-type direction signal is provided by said direction sensing means and counting in a second count direction in response to each occurrence of one of said mark signals when said second-type direction signal is provided by said direction sensing means;
a second counting means for providing a second count in response to said motion signals; said second counting means counting in said first counting direction in response to each occurrence of one of said motion signals when said first-type direction signal is provided said direction sensing means and alternately for counting in said second counting direction in response to each occurrence of one of said motion signals when said second-type direction signal is provided said direction sensing means;
means connecting said addressable memory, said first counting means, and said second counting means for providing an address corresponding to said first count to said address input and a data value corresponding to said second count to said data input; and
display means for providing a numerical display corresponding to said second count.

* * * * *